Dec. 12, 1933.　　　　B. FERGUSON　　　　1,939,548
AUTOMATIC RETAINER VALVE MECHANISM FOR RAILWAY AIR BRAKE SYSTEMS
Filed July 6, 1931　　　3 Sheets-Sheet 1

Barrington Ferguson
INVENTOR

BY Victor J. Evans
and Co. ATTORNEY

Dec. 12, 1933.  B. FERGUSON  1,939,548
AUTOMATIC RETAINER VALVE MECHANISM FOR RAILWAY AIR BRAKE SYSTEMS
Filed July 6, 1931  3 Sheets-Sheet 2

Barrington Ferguson
INVENTOR
BY Victor J. Evans and Co. ATTORNEY

Dec. 12, 1933.  B. FERGUSON  1,939,548
AUTOMATIC RETAINER VALVE MECHANISM FOR RAILWAY AIR BRAKE SYSTEMS
Filed July 6, 1931  3 Sheets-Sheet 3
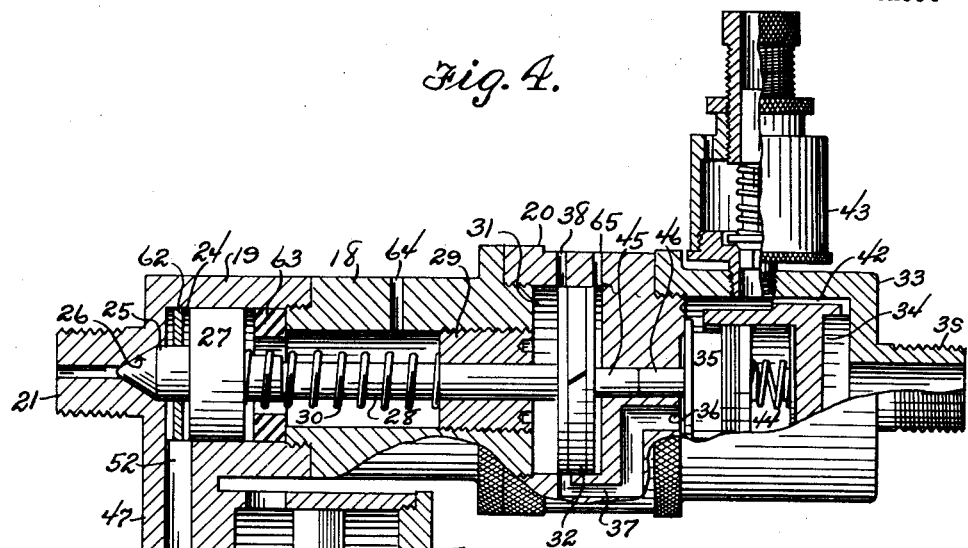
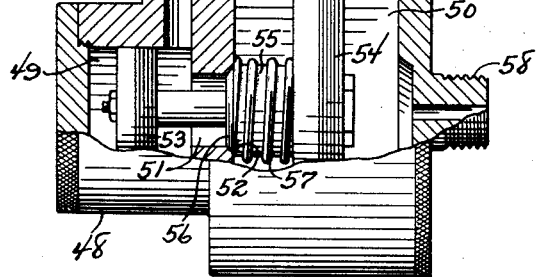
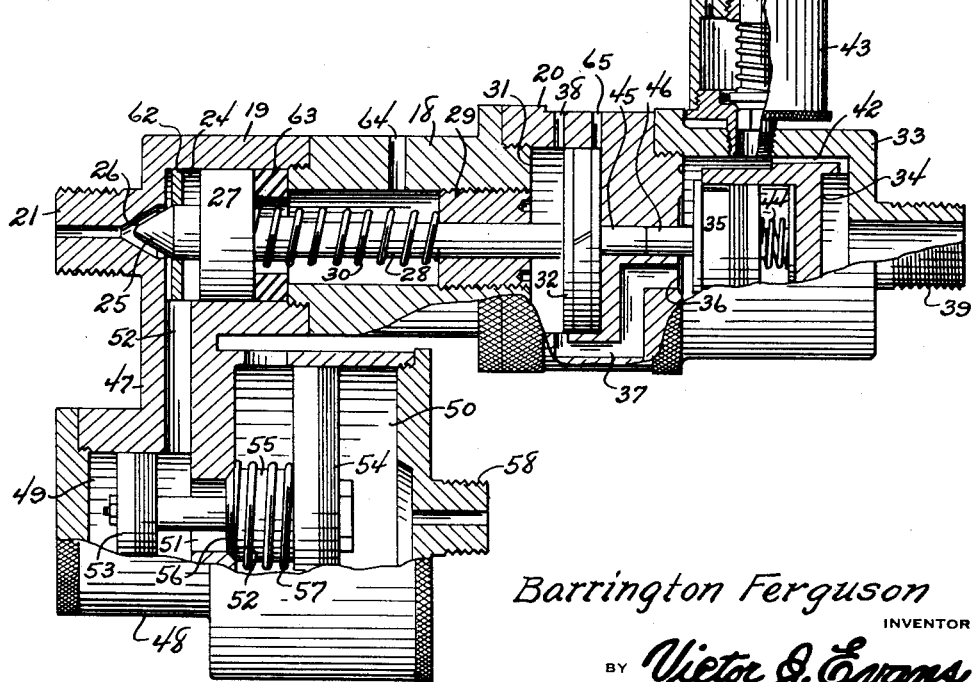
Barrington Ferguson
INVENTOR
BY Victor J. Evans and Co. ATTORNEY Patented Dec. 12, 1933

1,939,548

UNITED STATES PATENT OFFICE 1,939,548

AUTOMATIC RETAINER VALVE MECHANISM FOR RAILWAY AIR BRAKE SYSTEMS

Barrington Ferguson, Fernie, British Columbia, Canada

Application July 6, 1931. Serial No. 549,060

5 Claims. (Cl. 303—77)

The invention relates to air brake retainer or release controls, and more especially to automatic retainer valve mechanism for railway air brake systems.

The primary object of the invention is the provision of a mechanism of this character wherein it automatically operates to enable the charging and recharging of an auxiliary reservoir of an air brake system, either when the brakes are applied or being released or after an application of the brakes so that a second or more applications of said brakes may be had without the release thereof.

It is a well known fact that in air brake systems now in common use, when a train is going down hill and a light application is made by the engineer of such brakes it is sometimes desired to make any number of other heavier applications for bringing the train to a standstill. It is found that several applications either light or heavy can be had by using the air in the auxiliary reservoir and furthermore it is necessary to release the brakes in order to recharge said auxiliary reservoir.

Another object of the invention is the provision of mechanism of this character wherein an unlimited number of applications of any degree whether they be light or heavy of the brakes may be had and the charging and recharging of the auxiliary reservoir of the brake system accomplished and thus eliminating the use of a hand retainer valve, as the said mechanism will be under the direct and sole control of the engineer of a train.

A still further object of the invention is the provision of mechanism of this character wherein the present day method of controlling release of automatic air brake by a hand retainer on each car and the said retainer being operated by a trainman and is opened and closed to suit the requirements in braking will be entirely eliminated as the retainer will be automatic and operable by a variation of train line pressure which is controlled directly from the brake valve in the cab of the locomotive.

A still further object of the invention is the provision of an automatic valve mechanism which is composed of a minimum number of parts with resultant simplicity in construction and positive of action and cheap to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 4 is a view similar to Figure 3 showing the mechanism in position after a reduction in the train line is made.

Figure 5 is a similar view with the mechanism in position after the train line of air brake is recharged.

Similar reference characters indicate corresponding parts throughout the several views in the drawings.

It will be stated in the air brake systems now in use the engineer of a train has no power to hold the brakes set until the auxiliary reservoir is fully charged and the automatic retainer mechanism constituting the present invention takes the place of the manually operated retainer valve.

As the automatic retainer valve is adapted for attachment to the air brake system in order to set the wheel brakes, until the auxiliary air brake is fully charged, a brief description of the operation of the brake mechanism will be given.

Figure 1:
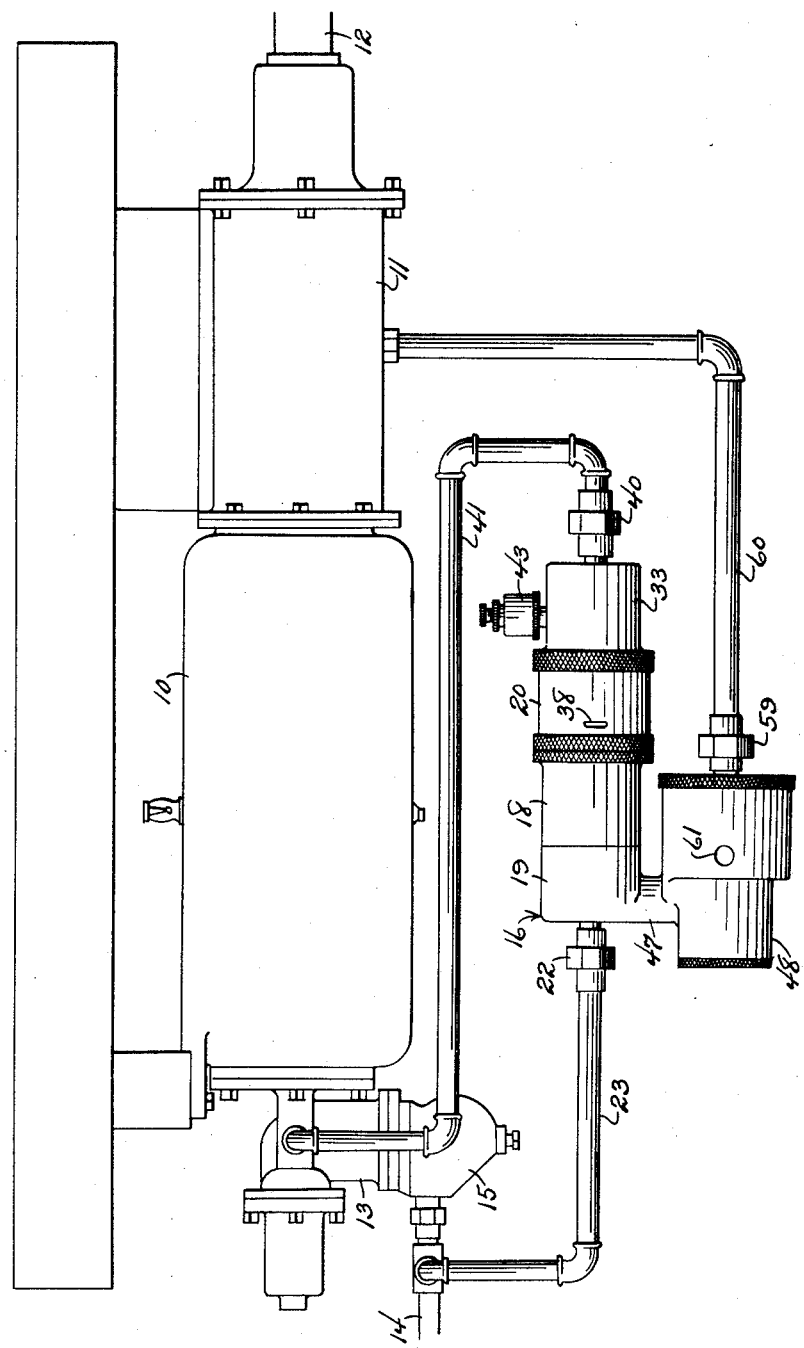
Figure 1 is a side elevation of an auxiliary air reservoir and triple valve of a train line with the automatic retainer valve mechanism constructed in accordance with the invention applied.
Figure 2:
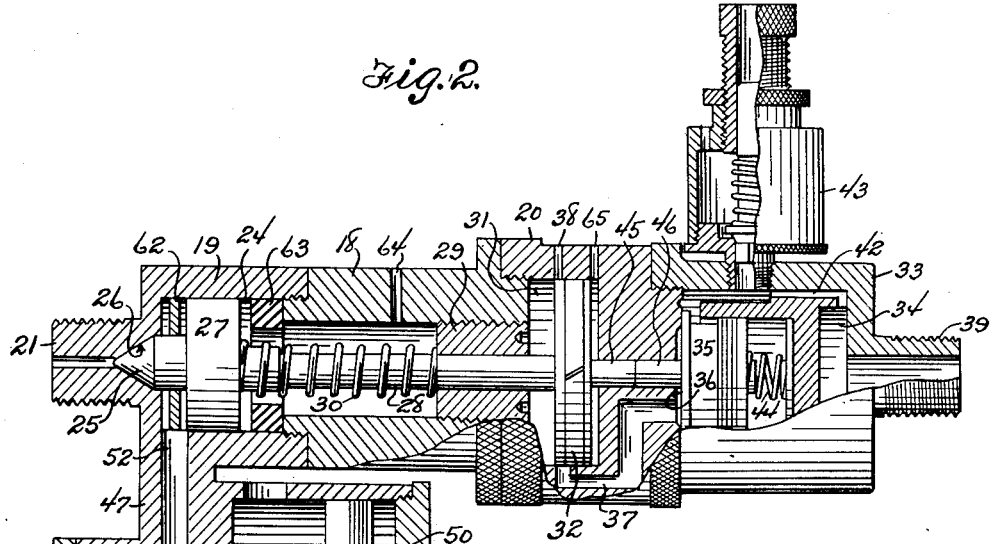
Figure 2 is a fragmentary longitudinal sectional view through the automatic retainer mechanism showing the same with its mechanism in position before the train line of air brake is charged.

Referring to the drawings in detail, particularly Figure 1, there is illustrated an auxiliary reservoir 10 in which the air is stored for use in the brake cylinder 11 and its use is confined to the car on which it is located. Working within the brake cylinder is the usual piston (not shown) connected with the brake pull rod 12 connected to the brake shoe actuating mechanism and this piston is operated by the air pressure from the auxiliary reservoir 10 in applying the brakes. In releasing the brakes the air leaves the brake cylinder 11 and is delivered into the triple valve 13 which is connected directly with the brake cylinder and when the brake is released the brake cylinder air flows back through to said triple control valve 13 and the triple valve exhaust to the atmosphere in a manner more fully described.

A pipe 14 is connected to the check valve casing 15 of the triple valve 13 and leads from the engine reservoir (not shown).

The automatic retainer valve mechanism comprises a casting 16 constituting a valve casing having the double valve body portion including an intermediate section 18 and outer sections 19 and 20 respectively, these being detachably united to each other, the section 19 being formed with a nipple 21 with which is connected through the medium of a coupling 22 the branch pipe 23 tapped into the pipe 14 which leads from the engine reservoir and delivers air into a chamber 24 in said section 19, the communication with the branch pipe 23 and the chamber 24 being controlled by a valve 25 engaging a seat 26 formed in the nipple 21 and this valve 25 is formed on a piston 27 operable within the chamber 24, the stem 28 of said piston being slidably fitted in an adjusting sleeve 29 mounted in the section 18 and this sleeve controls the tension of a coiled tensioning spring 30 surrounding the said stem 28 and working against the piston 27 to normally maintain the valve 25 engaging its seat 26 in the section 19 of the body.

The section 20 of the body is formed with a piston chamber 31 in which is arranged the piston 32 while on this section is a valve cap 33, the latter having therein a balance valve cage 34 in which is fitted a balance valve 35 engageable with the seat 36 therefor formed in the section 20 and this seat is intersected by an exhaust passage 37 formed in the section 20 and opening from the same to the atmosphere by the port 38.

The cap 33 has a nipple 39 engaged by a coupling 40 for the joining therewith of a pipe 41 leading to the exhaust of the triple valve 13 and establishing communication between the latter and the passage 42 within the cap 33 and the cage 34 to the seat 36 for the valve 35 and the passage 37 intersecting said seat.

Carried upon the cap 33 is a spring controlled escapement valve 43 which controls exhaust from the passage 42 to the atmosphere when the balance valve 35 is in position to close the passage 37 intersecting the seat 36 of said valve. The balance valve 35 is acted upon within the cage 34 through the medium of a tensioning spring 44.

The piston 32 carries a guide stem 45 and likewise the balance valve 35 carries a guide stem 46, these being fitted in a guideway in the section 20 and the piston 32 is movable in the chamber 31 in the path of the stem 28 of the valve piston 27 so as to be coactive therewith in the automatic operation of the control valve mechanism. Joined with the double valve body through the uniting portion 47 is a supplemental valve body 48 formed with the small and large piston chambers 49 and 50 respectively, these being communicative through the opening 51 having the valve seat 52, while the small chamber 49 has communication with the chamber 24 through the passage 52 and in these chambers 49 and 50 are the respective pistons 53 and 54 having a connecting stem 55 therebetween, the latter working through the opening 51. The piston 54 has formed thereon a valve 56 for engaging the seat 52 while surrounding the said valve 56 and active against the piston 54 is a tensioning spring 57 and this chamber 50 for the piston 54 through the medium of the nipple 58 and coupling 59 joins a pipe 60 therewith leading from the brake cylinder 11. The supplemental body 48 is provided with an exhaust port 61 leading from the chamber 50 on the side of the piston 54 next to the opening 51 and this port opens to the atmosphere.

The chamber 24 has a dividing member or wall 62 next to the valve seat 26 in the nipple 21 and the passage 52 communicates with the chamber 24 at opposite sides of said member or wall 62 and the purpose of this dividing wall or member is to prevent air entering said chamber from the pipe 23 acting directly on the piston 27 and thus making the valve 25 more sensitive to closing or engaging the seat 26 for said valve 25.

Arranged within the chamber 24 on the side of the piston 27 opposite the valve 25 thereon is a resilient ring seat 63 for the piston 27 as should be obvious.

The sections 18 and 20 are provided with suitable vents 64 and 65 respectively for the chambers 24 and 31 of the double valve body hereinbefore described.

In the operation of the automatic retainer valve mechanism, as heretofore stated, the air pressure from the brake cylinder 11 is exhausted into the atmosphere through a port in the triple valve 13 when the brake is released. This port is in communication by the pipe 41 with the passage 42 about the cage 34 in the cap 33 which is controlled by the balance valve 35, a part of the automatic retainer valve mechanism.

Figure 3:
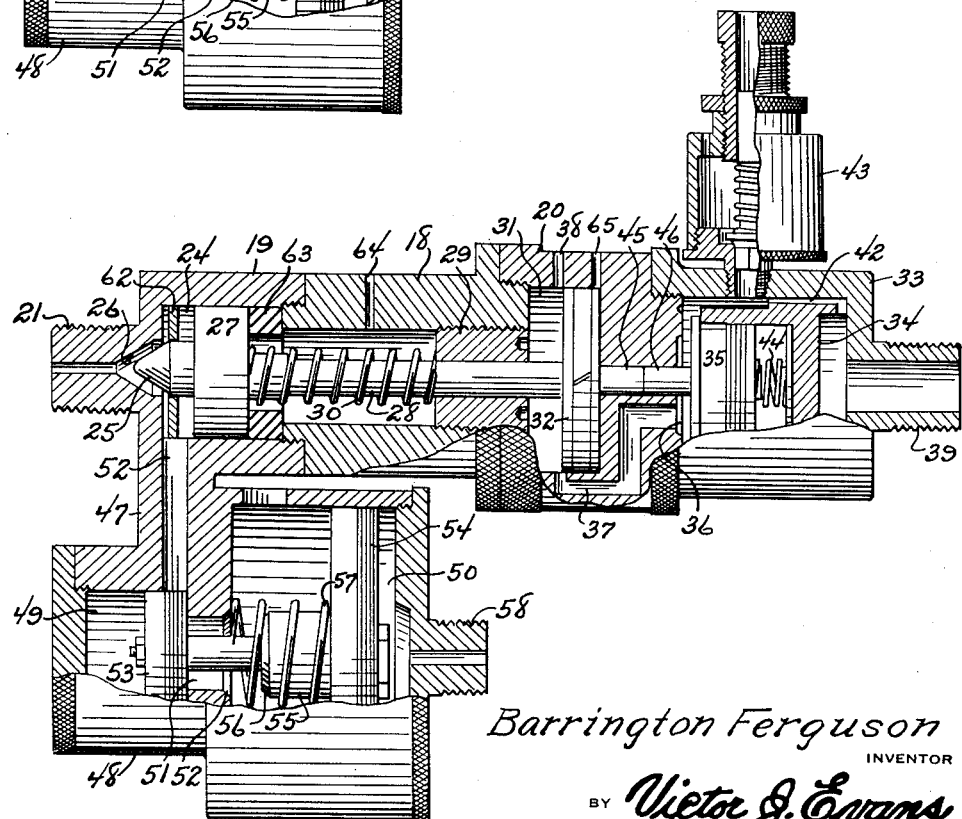
Figure 3 is a view similar to Figure 2 showing the position of the mechanism after the train line of air brake is charged.

In Figure 3 of the drawings the automatic retainer valve mechanism has its mechanism positioned before the train line of air brake is charged and when the train line pressure becomes equal to the tension of the spring 30 against the piston 27 with the valve 25 engaging the seat 26 the air from pipe 23 will flow faintly into the passage 52 which is sealed tightly by the piston 53 in the chamber 59, which piston is closing the opening 51 under the tension of the spring 57. The air will now be acting on the larger area formed by the piston 27 to give the latter sufficient lift or resistance against the spring 30, sealing the said piston 27 against the seat 63 and the stem 28 will now have moved through adjusting sleeve 29 moving the release piston 32 and also the balance valve 35 in the cage 34 against spring 44, thus uncovering the passage 37 which leads around release piston 32 to exhaust port 38 to atmosphere. The exhaust of air brake cylinder 11 will pass through pipe 41 into said passage 37 and be released through the port 38, this being the releasing position for said brake cylinder exhaust.

In Figure 4 of the drawings the retainer valve mechanism is shown in shifted position or retaining position so that when the brakes are applied by reducing train line pressure air from the brake cylinder 11 enters through pipe 60, the chamber 56 in the supplemental body moving piston 54 against the resistance of spring 57 causing the piston 53 to clear the opening 51 and air escapes from the passage 52 through the opening 51 into the chamber 50 and exhausts through the port 61 and owing to a portion of the stem 55 of said pistons 53 and 54 being smaller than the opening 51 air will be relieved from the chamber 24 quickly permitting the valve 25 to engage the seat 26 so that balance valve 35 and release valve 32 will now move by the tension of spring 30 to cover the passage 37 which leads to exhaust port 38 and piston 54 in moving will seat valve 56 at 52 again closing passage 52 in order to retain air in brake cylinder 11 after recharging train line. The air in train line is raised to a lesser degree than the tension of spring 30 keeping balance valve 35 against its seat 36 and the exhaust from brake cylinder 11 being admitted to the cap 33 or the passage 42 therein retaining a pressure equal to that within the passage 37 and valve 43 and this exhibits the retainer valve mechanism in retaining position.

In Figure 5 the retainer valve mechanism is in releasing position and in order to release the retainer valve mechanism, air is raised in the train pipe line to a greater degree than the spring 30, thus releasing the piston 32 and valve 35 to uncover passage 37 and open exhaust port 38 so that all air in the passage 37 will be released through said port 38 without the aid of the stem 28 and the spring 57 will now move piston 54 for the closing again of valve 25 whereupon the piston 53 will now close the opening 51 and also the passage 52 will be closed. Now when valve 25 disengages seat 26 again the retainer mechanism is in releasing position as shown in Figure 3 of the drawings.

It will therefore be apparent that the brake exhaust is prevented from escaping into the atmosphere through the retainer valve mechanism until the pressure in the auxiliary reservoir 10 has attained maximum capacity and said retainer valve mechanism will automatically release the exhaust from the triple valve 13 port for the brake cylinder 11 when such capacity is attained.

After another braking operation the retainer valve mechanism is repeated but no exhaust can escape into the atmosphere from the throttle valve 13 exhaust port after a braking operation until the reservoir 10 has its maximum pressure.

The spring 30 may be tensioned by the adjusting sleeve 39 and access thereto is had by the removal of the section 20 from the section 18 of the double valve body hereinbefore described.

From the foregoing it is thought that the construction and operation of the automatic retainer valve mechanism will be clearly understood and therefore a more extended explanation has been omitted.

What is claimed is:—

1. An automatic retainer valve mechanism for air brake systems including a train line, a triple valve, auxiliary reservoir and brake cylinder, comprising a valve casing having a double valved body portion including intermediate and outer sections detachably united together, a lead from one outer section to the train pipe, a piston in the last named section, a valve connected with the piston and controlling said lead, an adjustable sleeve in the intermediate section, a stem on the piston and slidable in the sleeve, tensioning means acting against the piston and regulated by the sleeve, a piston in the intermediate section and carried by said stem, a valve cap communicating with the triple valve exhaust on the intermediate section and having a balance valve cage, a balance valve in the cage and controlling exhaust from the cap to the intermediate section, a supplemental valve body and having small and large intercommunicating piston chambers communicative with the lead from the engine reservoir through said first named outer section, large and small pistons common to said last named chamber, a connecting stem between said last named pistons, a lead from the large piston chamber to the brake cylinder, and a valve formed on the large piston and controlling the intercommunication between the large and small piston chambers.

2. An automatic retainer valve mechanism for air brake systems including a train line, a triple valve, auxiliary reservoir and brake cylinder, comprising a valve casing having a double valved body portion including intermediate and outer sections detachably united together, a lead from one outer section to the train pipe, a piston in the last named section, a valve connected with the piston and controlling said lead, an adjustable sleeve in the intermediate section, a stem on the piston and slidable in the sleeve, tensioning means acting against the piston and regulated by the sleeve, a piston in the intermediate section and carried by said stem, a valve cap communicating with the triple valve exhaust on the intermediate section and having a balance valve cage, a balance valve in the cage and controlling exhaust from the cap to the intermediate section, a supplemental valve body and having small and large intercommunicating piston chambers communicative with the lead from the engine reservoir through said first named outer section, large and small pistons common to said last named chamber, a connecting stem between said last named pistons, a lead from the large piston chamber to the brake cylinder, a valve formed on the large piston and controlling the intercommunication between the large and small piston chambers, and means for tensioning the balancing valve in the valve cage.

3. An automatic retainer valve mechanism for air brake systems including a train line, a triple valve, auxiliary reservoir and brake cylinder, comprising a valve casing having a double valved body portion including intermediate and outer sections detachably united together, a lead from one outer section to the train pipe, a piston in the last named section, a valve connected with the piston and controlling said lead, an adjustable sleeve in the intermediate section, a stem on the piston and slidable in the sleeve, tensioning means acting against the piston and regulated by the sleeve, a piston in the intermediate section and carried by said stem, a valve cap communicating with the triple valve exhaust on the intermediate section and having a balanced valve cage, a balance valve in the cage and controlling exhaust from the cap to the intermediate section, a supplemental valve body and having small and large intercommunicating piston chambers communicative with the lead from the engine reservoir through said first named outer section, large and small pistons common to said last named chamber, a connecting stem between said last named pistons, a lead from the large piston chamber to the brake cylinder, a valve formed on the large piston and controlling the intercommunication between the large and small piston chambers, means for tensioning the balancing valve in the valve cage, and guide stems on the balancing valve and the piston in the intermediate section and cooperative with each other.

4. An automatic retainer valve mechanism for air brake systems including a train line, a triple valve, auxiliary reservoir and brake cylinder, comprising a valve casing having a double valved body portion including intermediate and outer sections detachably united together, a lead from one outer section to the train pipe, a piston in the last named section, a valve connected with the piston and controlling said lead, an adjustable sleeve in the intermediate section, a stem on the piston and slidable in the sleeve, tensioning means acting against the piston and regulated by the sleeve, a piston in the intermediate section and carried by said stem, a valve cap communicating with the triple valve exhaust on the intermediate section and having a balance valve cage, a balance valve in the cage and controlling exhaust from the cap to the intermediate section, a supplemental valve body and having small and large intercommunicating piston chambers communicative with the lead from the engine reservoir through said first named outer section, large and small pistons common to said last named chamber, a connecting stem between said last named pistons, a lead from the large piston chamber to the brake cylinder, a valve formed on the large piston and controlling the intercommunication between the large and small piston chambers, means for tensioning the balancing valve in the valve cage, and guide stems on the balancing valve and the piston in the intermediate section and cooperative with each other, the said intermediate section of the valve casing and the supplemental valve body being provided with exhaust ports.

5. An automatic retainer valve mechanism for air brake systems including a train line, a triple valve, auxiliary reservoir and brake cylinder, comprising a valve casing having a double valved body portion including intermediate and outer sections detachably united together, a lead from one outer section to the train pipe, a piston in the last named section, a valve connected with the piston and controlling said lead, an adjustable sleeve in the intermediate section, a stem on the piston and slidable in the sleeve, tensioning means acting against the piston and regulated by the sleeve, a piston in the intermediate section and carried by said stem, a valve cap communicating with the triple valve exhaust on the intermediate section and having a balance valve cage, a balance valve in the cage and controlling exhaust from the cap to the intermediate section, a supplemental valve body and having small and large intercommunicating piston chambers communicative with the lead from the engine reservoir through said first named outer section, large and small pistons common to said last named chamber, a connecting stem between said last named pistons, a lead from the large piston chamber to the brake cylinder, a valve formed on the large piston and controlling the intercommunication between the large and small piston chambers, means for tensioning the balancing valve in the valve cage, guide stems on the balancing valve and the piston in the intermediate section and cooperative with each other, the said intermediate section of the valve casing and the supplemental valve body being provided with exhaust ports, and a dividing member in the first named outer section of the valve casing next to the lead from the engine reservoir.

BARRINGTON FERGUSON.